United States Patent
Beeman et al.

(10) Patent No.: US 7,610,062 B2
(45) Date of Patent: Oct. 27, 2009

(54) IDENTIFICATION OF SIM BASED DEVICE

(75) Inventors: Bonnie L. Beeman, Renton, WA (US); Michael E. Prise, Kirkland, WA (US); Wen-Ping Ying, Bellevue, WA (US); Dinh C. Tat, Bellevue, WA (US); Zlata Koro, Mill Creek, WA (US); Rebecca L. Twigg, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 63 days.

(21) Appl. No.: 10/833,412

(22) Filed: Apr. 27, 2004
(Under 37 CFR 1.47)

(65) Prior Publication Data

US 2005/0059430 A1 Mar. 17, 2005

Related U.S. Application Data

(63) Continuation-in-part of application No. 10/662,752, filed on Sep. 15, 2003.

(60) Provisional application No. 60/525,676, filed on Nov. 26, 2003.

(51) Int. Cl.
*H04M 1/00* (2006.01)
(52) U.S. Cl. .................. 455/558; 455/433; 455/435.1; 455/414.1; 455/466; 455/559; 455/550; 455/41.2; 455/41.3
(58) Field of Classification Search .............. 455/433, 455/435.1, 414.1, 466, 558, 550, 41.2, 41.3, 455/559
See application file for complete search history.

(56) References Cited

U.S. PATENT DOCUMENTS

| 6,014,561 | A | 1/2000 | Moelne et al. |
| 6,603,969 | B1 * | 8/2003 | Vuoristo et al. ............. 455/433 |
| 2002/0078185 | A1 | 6/2002 | Swerup et al. |
| 2005/0009563 | A1 * | 1/2005 | Stenmark .................... 455/558 |

OTHER PUBLICATIONS

"Changes to 23.057 Sections 1-8; TS 23.057; Version 4.20" 3GPP TSG-T2, [Online] Oct. 18, 2001, Retrieved from the Internet: URL<http://www.3gpp.org/ftp/tsg_t/WG2_Capability/SWG1/SWG1_11_Portland/Docs/T2-MExE-010106%20-%20Changes%20to%2023.057%20-%20Sections%201-%208.doc> [retrieved on Sep. 28, 2006], p. 9, paragraph 4.9.2, p. 9, paragraph 4.9.3.

"Digital cellular telecommunications system (Phase 2+); Universal Mobile Telecommunications System (UMTS); USIM/SIM Application Toolkit (USAT/SAT); Service description; Stage 1 (3GPP TS 22.038 version 5.3.0 Release 5); ETSI TS 122 038" ETSI Standards, European Telecommunication Standards Institute, Sophia Antipolis Cedex, FR, vol. 3-SA1, No. V530, Jun. 2003, ISSN: 0000-0001.

* cited by examiner

*Primary Examiner*—Charles N Appiah
*Assistant Examiner*—Randy Peaches
(74) *Attorney, Agent, or Firm*—Moazzam & Associates, LLC

(57) ABSTRACT

A subscriber identity module includes at least one processor and logic that, when applied to the processor(s), results in a terminal device providing a device identifier to the subscriber identity module. The subscriber identity module forms a message including the device identifier and causes the terminal device to communicate the message to a network.

39 Claims, 9 Drawing Sheets

IDENTIFICATION OF SIM BASED DEVICE

PRIORITY

This is a continuation-in-part of U.S. patent application Ser. No. 10/662,752 filed on Sep. 15, 2003.

This application claims the benefit of U.S. Provisional Application No. 60/525,676, filed on Nov. 26, 2003.

TECHNICAL FIELD

The present disclosure relates to identifying devices to a network.

BACKGROUND

Wireless telephones are popular, ubiquitous devices. It is now possible to make and receive phone calls from almost any place in the world. Communication is even possible from remote and undeveloped areas using wireless satellite telephones. Herein, the term wireless telephone refers to any device capable of transmitting and receiving voice and/or data (non-voice) information to and from a network without the use of wires, cables, or other tangible transmission media. So-called cellular telephones are a common example of wireless phones.

Wireless telephones and the networks by which they communicate operate according to various technologies, including analog mobile phone service (AMPS), circuit switching, packet switching, wireless local area network (WLAN) protocols such as IEEE 802.11 compliant networks, wireless wide-area networks (WWAN), short-range RF systems such as Bluetooth, code division multiple access (CDMA), time division multiple access (TDMA), frequency-division multiplexing (FDM), spread-spectrum, global system for mobile communications (GSM), high-speed circuit-switched data (HCSD), general packet radio system (GPRS), enhanced data GSM environment (EDGE), and universal mobile telecommunications service (UMTS). Of course, these are only examples, and other technologies may be employed in wireless communication as well.

Herein, the term 'wireless device' is meant to include wireless telephones (including cellular, mobile, and satellite telephones), and also to include a variety of other wireless devices, including wireless web-access telephones, automobile, laptop, and desktop computers that communicate wirelessly, and wireless personal digital assistants (PDAs). In general, the term 'wireless device' refers to any device with wireless communication capabilities.

Many companies produce wireless telephones and other wireless devices. Among the more well-known producers are Nokia®, Ericsson®, Motorola®, Panasonic®, Palm® Computer, and Handspring®. A variety of producers also provide wireless devices comprising versions of the Microsoft® Windows® operating software.

Modern wireless devices may accept a subscriber identity module (SIM). The SIM identifies a subscriber of the network by which the wireless device communicates. A "subscriber" represents one or more persons or entities (corporations, partnerships, agents, operators, etc.) with access privileges to the network. A subscriber may be or represent a single user, or may represent one or more users. "User" refers to any person (or, conceivably, autonomous or semi-autonomous logic) with access privileges to the network. Typically the user is the operator of a terminal device, although a user could also be the operator of a device or devices that provide services via the network.

"Terminal device" refers to any device employed by a user to access the network environment. A mobile device, also called mobile equipment, is a portable terminal device that typically, but not necessarily, is also a wireless device. Laptop computers are examples of mobile devices.

A "service" is information and acts available via the network. Examples of services include the Short Message Service (SMS), email, and stock quotes. A "service provider" is any device or combination of devices that provides services via the network environment. Typically, a service provider provides information delivery to terminal devices, and/or performs network actions in response to requests from terminal devices. A service provider may also provide information delivery and/or network actions on behalf of another service provider.

A problem may arise when devices are employed to access the network by multiple subscribers. For example, a first subscriber may employ a computer to access the network and may reconfigure the computer's settings to provide compatibility with the services that the subscriber is authorized to receive from the network. A second subscriber may later attempt to employ the computer to access the network and a set of services authorized for the second subscriber. However, the computer's configuration may be incompatible with the second subscriber's services, leading to problems with accessing the services and/or using the computer. Other problems may arise when a SIM is moved to a terminal device that is not configured for access to the network to which the subscriber has access privileges, and/or when the terminal device is moved to a location where the device configuration is insufficient to access network services. These problems in turn can lead to decreased customer satisfaction, increases in help calls, and lost revenue for the network operator and service providers.

GSM technology provides separate identities for devices that access GSM networks, and the users of those devices. Thus, a device that accesses a GSM network may comprise a device identifier, to distinguish the device from others that access the network. Each person that uses the device may be assigned a subscriber identifier. Thus, a single subscriber may, at different times, access the GSM network from multiple devices, and a single device may be employed to access the network by multiple subscribers.

An equipment identify registry (EIR) is a network element responsible for collecting and managing device identifiers. The collection of device identifiers comprised by an EIR may be applied for fraud control, customer service, and other uses. Some networks employing technology other than GSM do not provide for separate equipment and subscriber identity, and thus to not employ an EIR. TDMA networks are an example of networks that do not provide for separate device and subscriber identity. Providing for EIR-type functionality in such networks may involve cost-prohibitive replacement and/or upgrades of switching and other network elements.

SUMMARY

The following summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art can obtain a full appreciation of aspects of the invention from the subsequent detailed description, read together with the Figures, and from the claims (which follow the detailed description).

A subscriber identity module (SIM) includes at least one processors and logic that, when applied to one or more of the processor(s), results in a terminal device providing a device identifier to the SIM, forming a message comprising the device identifier, and causing the terminal device to communicate the message to a network. The SIM may form a message that is one of Short Message Service, Enhanced Message Service, Multimedia Message Service, and SyncML. The message may include a subscriber identifier. The device identifier may be an International Mobile Equipment Identity, and the subscriber identifier may include an International Mobile Subscriber Identity and/or an Integrated Circuit Card ID.

BRIEF DESCRIPTION OF THE DRAWINGS

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well known structures and functions have not been shown or described in detail to avoid unnecessarily obscuring the description of the embodiments of the invention. References to "one embodiment" or "an embodiment" do not necessarily refer to the same embodiment, although they may.

Herein, "logic" refers to any information having the form of instruction signals and/or data that may be applied to affect the operation of a processing device. Examples of processing devices are computer processors (processing units), microprocessors, digital signal processors, controllers and microcontrollers, and so on. Logic may be formed from signals stored in a device memory. Software is one example of such logic. Examples of device memories that may comprise logic include RAM (random access memory), flash memories, ROMS (read-only memories), EPROMS (erasable programmable read-only memories), and EEPROMS. Logic may also be comprised by digital and/or analog hardware circuits, for example, hardware circuits comprising logical AND, OR, XOR, NAND, NOR, and other logical operations. Logic may be formed from combinations of software and hardware.

"Information" is configurations of matter representing knowledge, e.g. "data". Examples of information are collections of magnetic or optical bits.

A "network element" is any one or more devices of a communication network, e.g. devices that participate at least occasionally in the operation of the network.

Typically, a subscriber will enter into contractual arrangements with a network operator for access rights to the operator's network(s). Networks of this operator for which the subscriber has contractual access rights are the subscriber's "home networks." Networks other than the home networks of the subscriber are "roaming networks." The subscriber and the subscriber's wireless device are said to be "roaming" when accessing a roaming network.

Figure 1:
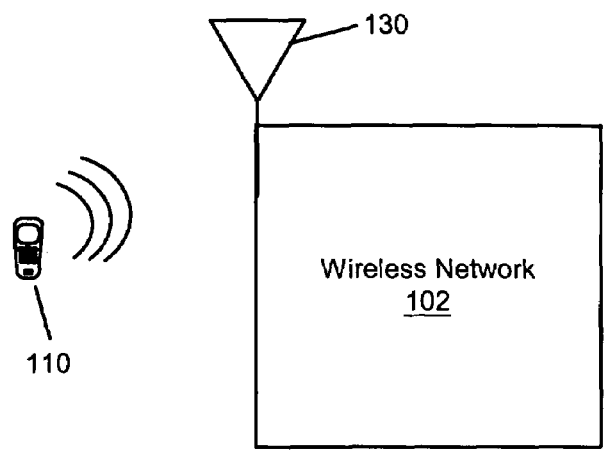
FIG. 1 is a block diagram of an embodiment of a wireless communication arrangement.

FIG. 1 is a block diagram of an embodiment of a wireless communication arrangement. A terminal device 110 communicates with a network 102. The network 102 receives signals from the terminal device 110 via antennae 130.

Figure 2:
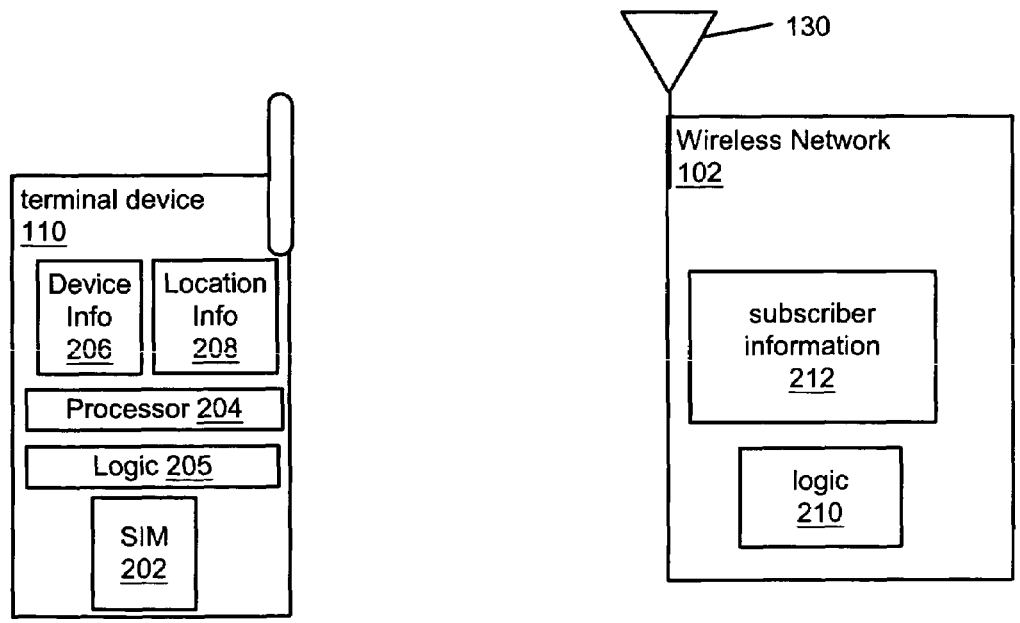
FIG. 2 is a more detailed block diagram of an embodiment of a wireless communication arrangement.

FIG. 2 is a more detailed block diagram of an embodiment of a wireless communication arrangement. The terminal device 110 comprises device information 206, location information 208, a processor 204, logic 205, and a subscriber identity module (SIM) 202. Device information 206 comprises information about the device's capabilities to receive, process, and display information. For example, device information may comprise information about the device's graphic display capabilities, communication bandwidth, and processor speed. Device information 206 may also include information about the device model, the version(s) of logic 205 comprised by the device (e.g. BIOS version, operating system version, software versions, etc.), the last know error to occur during the operation of the device, installed software applications, and language settings, among other things. Device information 206 may also comprise information about how the BIOS, operating system, installed software applications, and other components of the terminal device 110 are configured to operate.

The terminal device 110 comprises a processor 204 and logic 205. The logic 205, when applied to the processor, may cause the terminal device 110 to carry out acts of and in accordance with the methods described herein.

Location information 208 comprises information about the location of the terminal device 110. Such information may be useful in determining the type of information to deliver, the quality and quantity of information to deliver, and so on. In other words, location information may be useful when delivering services to the device. Location information may be 'literal', e.g. a geographic address or location, or 'logical', e.g. "In a Meeting", "In Transit", and so on.

The SIM 202 and the terminal device 110 may be coupled in such a manner that the two may be easily coupled and decoupled. For example, the SIM 202 may insert into a slot in the terminal device 110. A subscriber of the network may remove the SIM 202 from the terminal device 110 and couple it to another terminal device. Likewise, another subscriber may replace the SIM 202 in the device with another SIM representing the other subscriber.

The network 102 comprises subscriber information 212 and logic 210. Subscriber information 212 may comprise such information as a subscriber id, payment parameters, service provision information, service delivery information, billing and settlement information, access network information, and security and access control information.

The logic 210 may cause the network 102 to carry out acts of and in accordance with the methods described herein.

The subscriber id identifies a subscriber from among subscribers to the network. Payment parameters describe the manner and terms of payment. Examples are monthly subscription charges, flat-fee arrangements, per-use arrangements, pre-paid amounts, and so on. Service provision information describes a level or package of services available to the subscriber. Examples are premium, standard, and basic. Service delivery information describes a level of service available to the subscriber from the network. Examples include 100 Mbps (megabit per second) service, and guaranteed information delivery. Billing information describes how the subscriber is to be charged. This information may include the subscriber's billing address, credit or debit card information, and/or account numbers. Settlement information describes information about current charges to the subscriber. Examples include information about the subscriber's current charges, and due and past-due charges. Access network information describes the manners of network access the subscriber may employ. Examples include GPRS, 2G, 3G, and circuit switching. Security information describes how the subscriber may protect information communicated to or from the network. Examples are digital signature and encryption key information. Access control information describes how the subscriber may access information and/or acts available via the network to which access is controlled. Examples include id and password information.

The subscriber information 212 may comprise information about services available to the subscriber, e.g. those services which the subscriber is authorized to access. Services may be characterized by service information, including a service identifier, a service type, a service description, service requirements, performance requirements, quality of service information, network resource requirement information, network resource allowance information, and security and access control information.

The service identifier identifies the service from among services available via the network. The service type identifies the type of service, e.g. business, consumer, entertainment, etc. The service description describes the service, such as "Real-Time Stock Quotes". Service requirements describe requirements for the service to be properly provided. For example, service requirements may include information about the graphics, processor, memory, communications, payment capacity, and other requirements that a device, and/or user, and/or subscriber should meet in order for the service to be provided. The service requirement information may be organized according to categories, such as graphics, processor, memory, and communications. Of course these are merely examples of possible categories. The categories may be defined to correspond with the categories of the device information 206. For example, the graphics category may comprise information about the graphics requirements to properly render the service information, information such as the display size, graphics processor, and colors that a device should employ to properly render the service to the user. The processor category may comprise information about the processing capabilities that need be employed by a device to properly receive and render the service (e.g. processor speed). The memory category may comprise information about the memory requirements to properly receive and render the service on a device (e.g. minimum available memory, memory speed). The communication category may comprise information about the communication requirements to properly receive and render the service on a device (e.g. bandwidth, codec).

Quality of service information describes the quality of service that the service requires from the network. Network resource requirement information describes the network resources that need be allocated in order to carry out the actions of the service. For example, the network resource requirement information may comprise bandwidth and memory allocation requirements. Network resource requirements may also include a relay server address and WAP gateway information, among other things. The network allowance information describes the network resources actually made available to carry out the actions of the service. For example, a streaming video service may require 10 Mbps of network bandwidth to deliver streaming video to terminal devices. However only 1 Mbps of bandwidth may be allowed. Security information describes how the information of the service is protected during communication over the network. Examples are digital signature and encryption key information. Access control information describes how the service provider may access information and/or acts available via the network to which access is controlled. Examples include id and password information.

Figure 3:
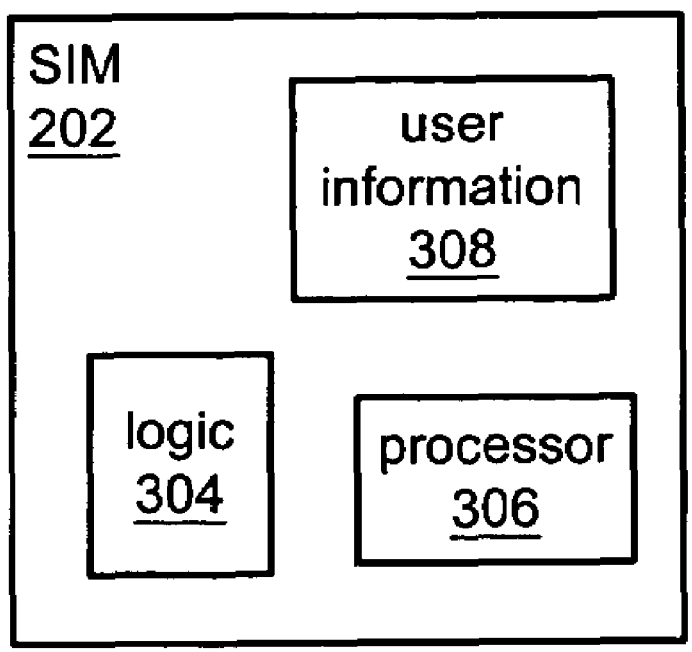
FIG. 3 is a block diagram of an embodiment of a SIM.

FIG. 3 is a block diagram on an embodiment 202 of a SIM. The SIM 202 comprises user information 308, logic 304, and a processor 306.

The logic 304, when applied to the processor 306, may cause the SIM 202 to carry out acts of and in accordance with the methods described herein.

The user information 308 may comprise information such as a user id, media delivery preferences, presence information, usage information, demographic Information, association information, and personalization information.

The user id identifies a user from among users of the network. Media delivery preferences include information about the manner in which information should be communicated to the user. Examples include frame rate, color schemes, visual quality, and visual layout. Usage information comprises information about the user's access to the network environment, possibly including how, when, how often, and for what purpose the user accessed the network environment. Usage information may include information about which services a user accesses and/or how often, and/or the most recently used and/or most frequently accessed services. The usage information may also comprise information about trends and patterns in the user's usage behavior.

Personal information describes a user. Examples are the user's name and address, as well as a user's privacy information (restrictions on distribution of the user profile information). Demographic information may be used to classify a user for statistical, marketing, or other purposes. Examples include the user's age, race, and gender. Association information describes other users and/or subscribers that have an association with the user. The association information may also describe the nature of the association. Examples include associates, family members, and patrons.

Personalization information describes a user's preferred, most recent, and/or most frequent settings for services that the user may access. Examples include a user's preferred type of news information (sports, local events, etc.) and a user's most frequent and/or most recent search queries.

Security information describes how the user may protect information communicated to or from the network. Examples are digital signature and encryption key information. In various embodiments the subscriber security information may be applied to protect the communications of the users associated with the subscriber. Alternatively, or in addition, the user security information may be applied to protect the communications of the users associated with the subscriber, independent of one another.

Access control information describes how the user may access information and/or acts available via the network to which access is controlled. Examples include id and password information. In various embodiments the subscriber security information may be applied to provide the users associated with the subscriber access to restricted information. Alternatively, or in addition, the user access control information may be applied to provide the users associated with the subscriber independent access to the restricted information.

Figure 4:
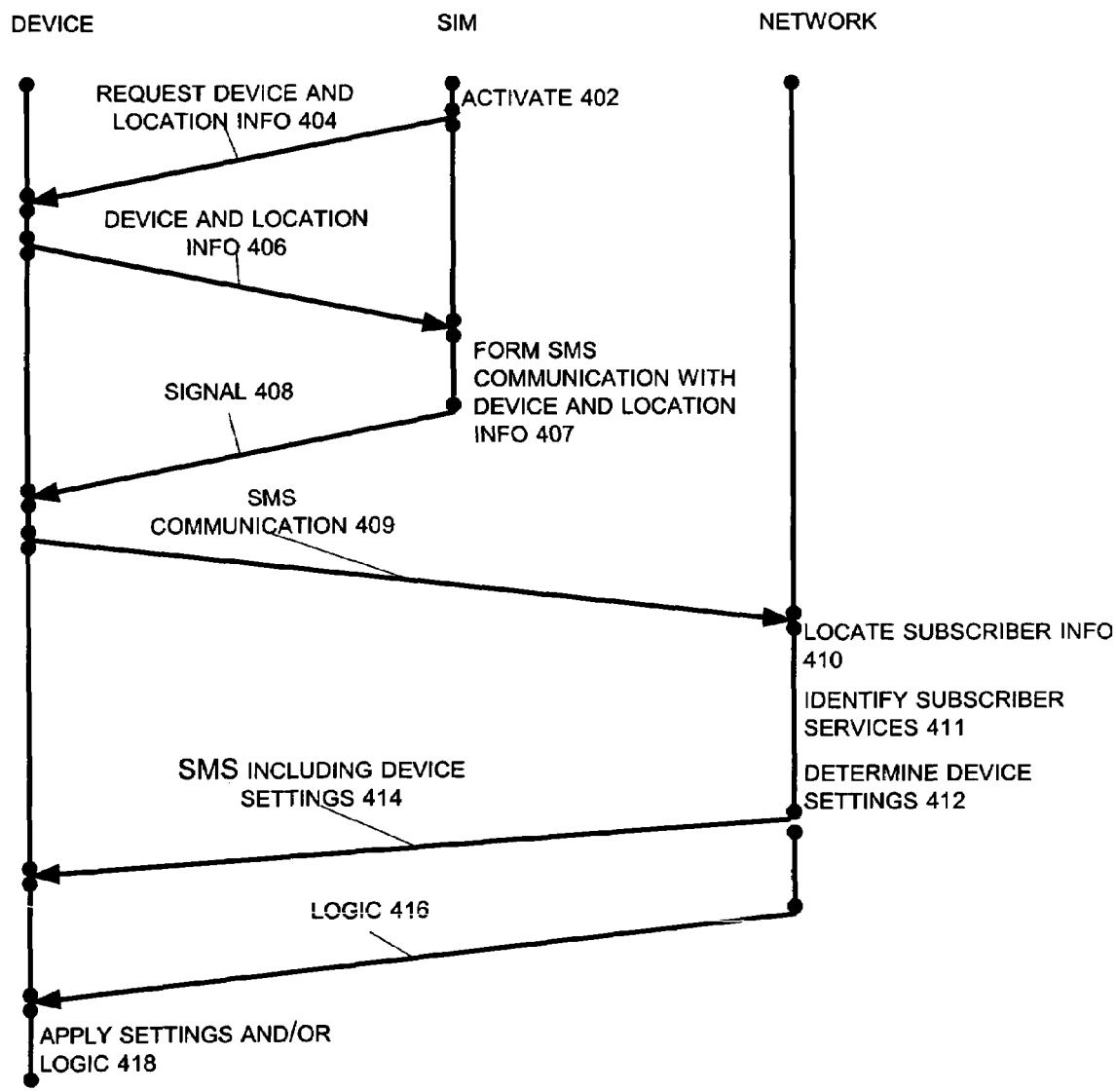
FIG. 4 is a flow chart of an embodiment of acts of configuring a device to access services of a network.

FIG. 4 is an action diagram of an embodiment of a method of configuring a device to access services of a network. At 402 a SIM is activated in the device. "Activation" can be triggered by different events, including coupling (e.g. inserting) the SIM into the device, powering on the device with which the SIM coupled, and pressing a button or otherwise issuing a command to the device. Activating the SIM results at 404 in a request to the device for device and location information. The device and location information are returned to the SIM at 406. At 407 the SIM formulates a communication including at least some of the device information, and possibly also at least some of the location information. In some embodiments the communication is formulated only when the terminal device is different than the terminal device used with a previous activation of the SIM. At 408 the SIM signals the device to transmit the communication to the network. The communication is transmitted at 409.

In one embodiment, the communication employs the Short Message Service (SMS) technique. SMS, otherwise known as text messaging, mobile messaging, or alphanumeric paging, allows for the communication of short text and numeric messages to and from wireless devices, as well as to and from public SMS messaging gateways on the Internet.

Another communication technique that may be employed is Enhanced Message Service (EMS). EMS supports the capabilities of SMS to communicate short text and numeric messages, but also includes capabilities for the communication of other types of data, including sound, animation, graphics, and additional text-formatting capabilities.

Yet another communication technique that may be employed is Multimedia Message Service (MMS). MMS provides for the communication of video and other advanced multimedia formats. Yet another communication technique that may be employed is SyncML. SyncML is based on the Extensible Markup Language (XML), and provides a standard manner of synchronizing data between devices and network applications.

At 410 the network locates subscriber information corresponding to the user information and/or device information communicated from the device. At 411 the network employs the subscriber information to identify those services that may be provided to the subscriber (e.g. those services available under the subscriber's subscription plan). At 412 settings for the device are determined The settings are based at least in part upon the identified services and also based at least in part upon the device information and/or user information (e.g. device capabilities to display and process information, and user preferences).

At 414 the network communicates the determined device settings to the device. The communication may be accomplished using SMS, EMS, MMS, SyncML, or some other technique. The network may also, at 416, communicate logic (e.g. software) to the device. At 418 the device applies the settings and/or logic to configure for the services available to the subscriber.

Embodiments of a wireless network will now be described in conjunction with FIGS. 5-7. In the description, particular network elements are identified that may comprise the subscriber information 212 and logic 210 to carry out acts described herein. These network elements are identified by way of example and not limitation, e.g. the subscriber information 212 and the logic 210 may be comprised by network elements other than those specifically identified in the figures.

Figure 5:
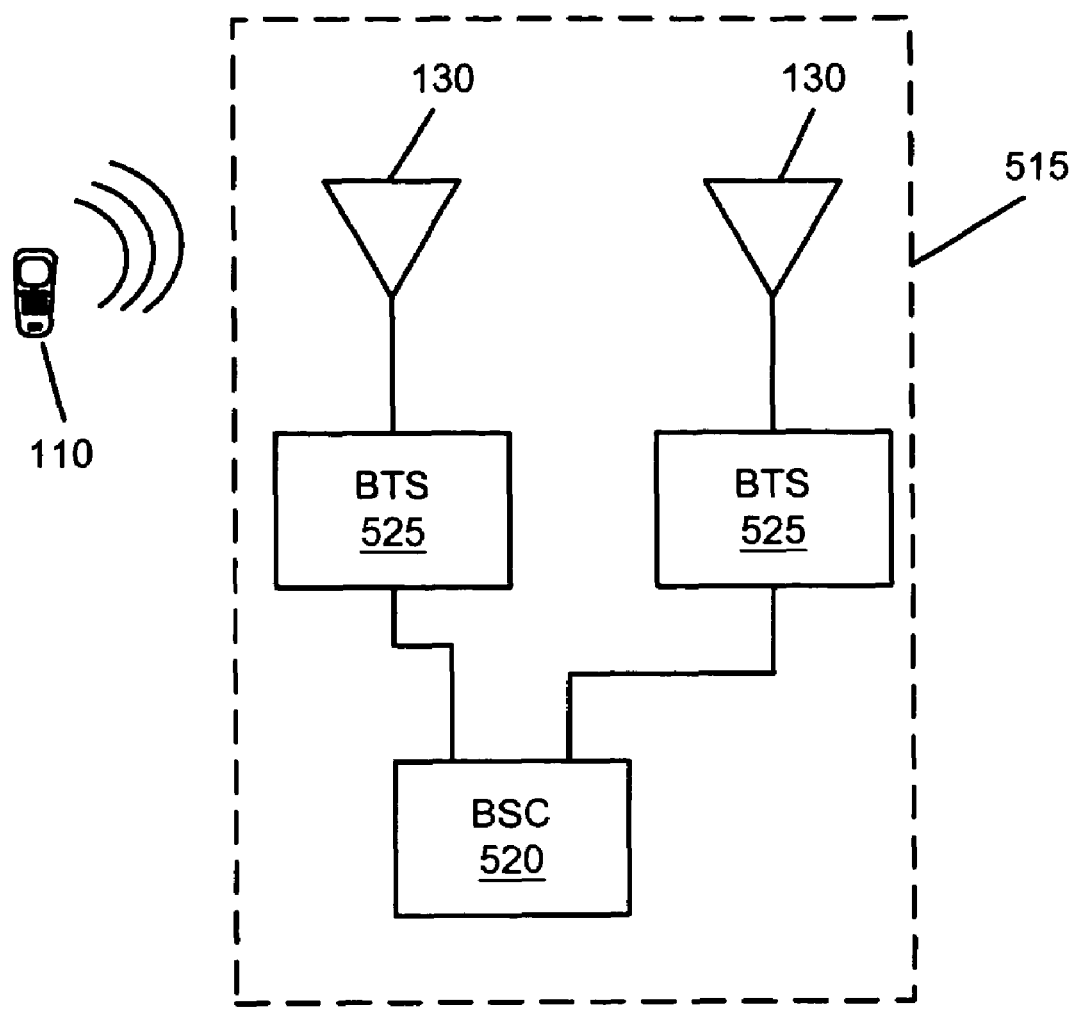
FIGS. 5-7 are block diagrams of embodiments of portions of a network environment.

FIG. 5 shows a block diagram of the base station subsystem of a wireless network. The base station subsystem (BSS) 515 consists of base station controllers (BSC) 520 coupled to one or more base transceiver stations (BTS) 525. In turn, each BTS 525 is coupled to one or antennae 130.

The BTS 525 includes transmitting and receiving equipment to create a radio interface between the wireless network and terminal devices. Although the antennae 130 is shown as a separate element for clarity, it is common in the industry to collectively refer to the antennae 130, transmitter, and receiver, as the BTS.

The BSC 520 may perform management of the radio interface by allocating channels, managing handover from one BTS to another, paging the wireless device, and transmitting connection-related signaling data.

Figure 6:
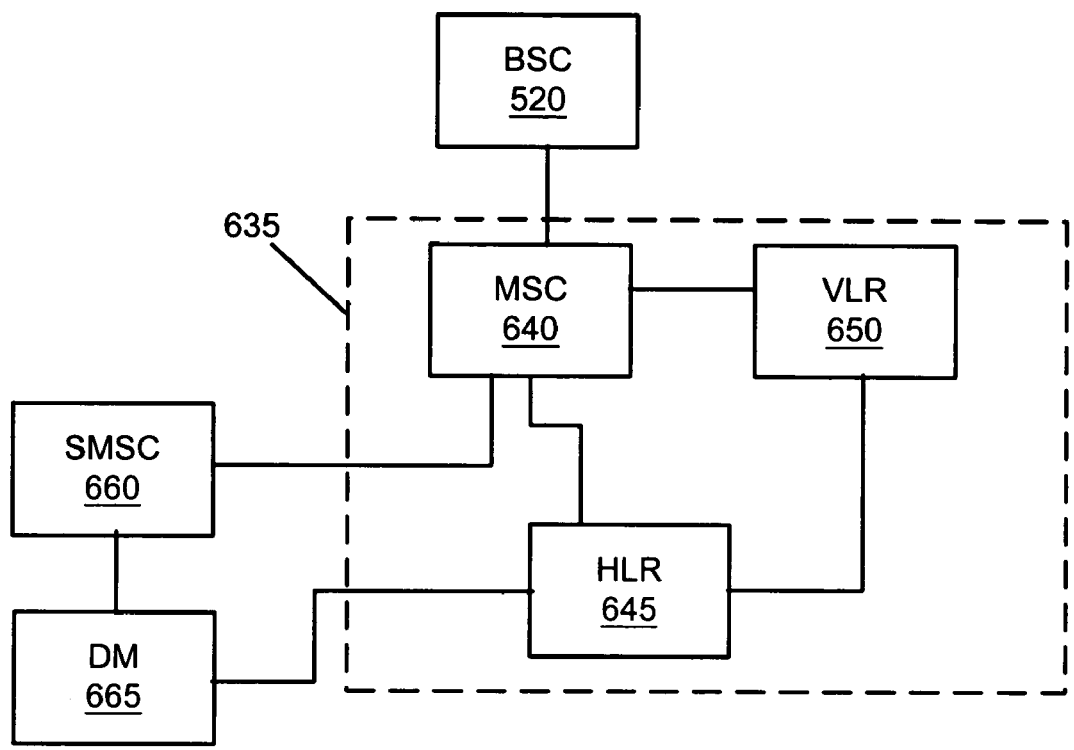

FIG. 6 is a block diagram of the networking and switching subsystem (NSS) 635 of a wireless network. The NSS 635 comprises a Mobile Switching Center (MSC) 640, a Home Location Registry (HLR) 645, and a Visitor Location Registry (VLR) 650. Switching and network management functions are carried out by the NSS 635. The NSS 635 may also act as a gateway between the wireless network and other networks such as the Public Switched Telephone Network (PSTN), Integrated Services Digital Network (ISDN), the Internet, other wireless networks, and the Public Data Network (PDN).

The MSC 640 is a digital switching mechanism that routes communications and manages the network. In GPRS networks, GPRS support nodes (GSNs) such as Switching GSNs (SGSNs) and Gateway GSNs (GGSNs) may provide switching operations similar to those provided by the MSC 640. There can be many switches 640 in a communication network, each responsible for the signaling required to set up, maintain, and terminate connections to wireless devices within the geographical area served by the switch 640. Each MSC (switch) 640 may manage several BSC 520. The MSC 640 is coupled to a Home Location Registry (HLR) 645 and a Visitor Location Registry (VLR) 650. The HLR 645 is also coupled to the VLR 650.

In one embodiment, at least part of the subscriber information 212 is comprised by the HLR 645. Also, the HLR 645 may comprise certain dynamic or temporary subscriber data such as current Location Area (LA) of the subscriber's mobile station and Mobile Station Roaming Number (MSRN). Subscriber-related data is recorded in the HLR 645 from which billing and administrative information is extracted when needed by the cellular service provider. Some wireless networks have only one HLR 645 that serves all subscribers; others have multiple HLRs.

In one embodiment, the MSC 640 comprises at least part of the logic 210 to locate subscriber data, identify subscriber services, determine terminal device settings, and communicate the settings and possibly associated logic to the terminal device. In one embodiment, the HLR 645 comprises at least part of the logic 210 for subscribers of the home network. The VLR 650 may comprise similar logic 210 for roaming subscribers.

The MSC 640 uses the VLR 650 to manage the wireless devices that are currently roaming in the area controlled by the MSC 640. The VLR 650 stores information such as the International Mobile Subscriber Identity (IMSI), authentication data, and telephone number of the roaming wireless devices. The VLR 650 may obtain and comprise subscriber information, such as information about the services to which a roaming wireless device is entitled, from the HLR that serves the wireless device. The VLR 650 controls a pool of MSRN and allocates an MSRN and TMSI to the roaming wireless device. The VLR 650 sends the MSRN and Temporary Mobile Subscriber Identity (TMSI) information to the HLR 645 where they are stored with the subscriber's dynamic records for later use in call routing.

A Short Message Service Center (SMSC) 660 may be coupled to the MSC 640 to provide for SMS communication to and from the network. The SMS communication from a terminal device may be routed by the SMSC 660 to a device management (DM) network element 665. The DM 665 may comprise a processor and at least part of the logic 210 to locate subscriber data, identify subscriber services, determine terminal device settings, and communicate the settings and possibly associated logic to the terminal device. The DM 665 may be coupled to one or more network elements comprising the subscriber information. For example, the DM 665 may be coupled to the HLR 645 in embodiments where the HLR 645 comprises the subscriber information.

In one embodiment the VLR 650 comprises at least part of the subscriber information for the users of wireless devices that are roaming the network 102.

Figure 7:
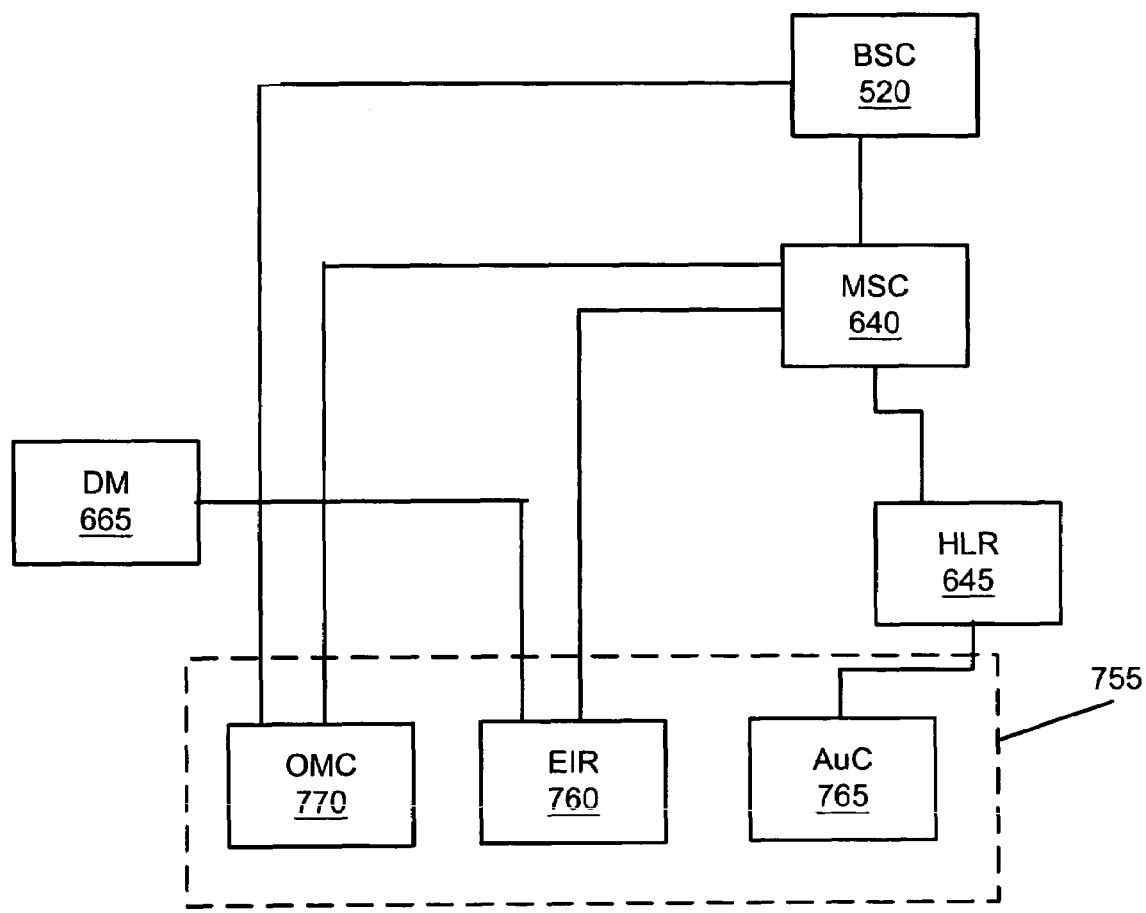

FIG. 7 is a block diagram of the operation subsystem (OSS) 755 of a network 102. The OSS 755 may include an Equipment Identity Register (EIR) 760, an Authentication Center (AuC) 765, and an Operating and Maintenance Center (OMC) 770. The OSS 755 may provide subscription management, network operation, network maintenance, and mobile equipment management.

The AuC 765 stores data related to network security and authentication of wireless devices and subscribers. A purpose of the AuC 765 is to prevent fraud by verifying the identity of subscribers and/or devices that try to access the network. Thus the AuC 765 may comprise authentication algorithms and encryption codes necessary to protect a subscriber's access rights and identity and to prevent eavesdropping.

The EIR 760 is a database which stores International Mobile Equipment Identity (IMEI) numbers. Wireless devices are uniquely identified by an IMEI or equivalent number such as an Electronic Serial Number (ESN). An EIR 760 generally indicates the status of a particular wireless device by flagging the IMEI of a device identified stolen, suspended, or malfunctioning.

The OMC 770 monitors and controls other network elements to enhance system performance and quality. The OMC 770 also administers billing, subscriber service data, and generation of statistical data on the state and capacity of the network.

In one embodiment, one or more of the AuC 765, EIR 760, and OMC 770 may comprise at least part of the subscriber information 212 and logic 210.

Figure 8:
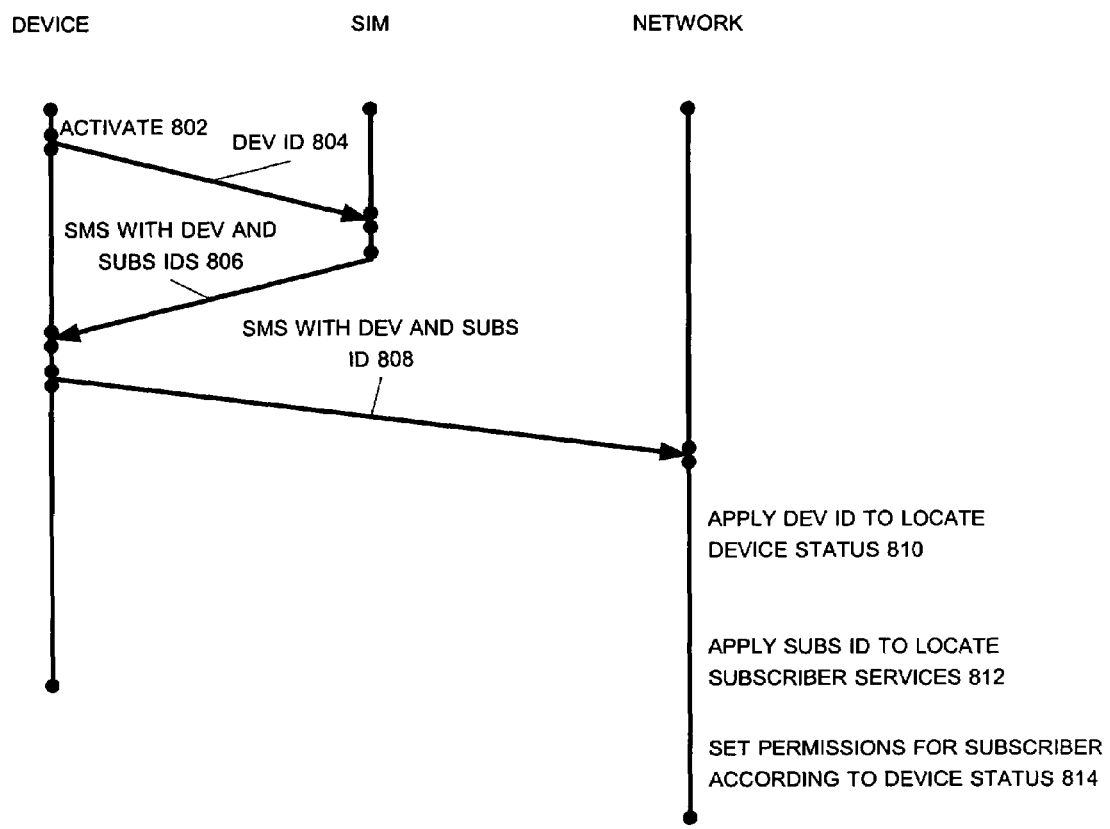
FIG. 8 is an action diagram of an embodiment of a method of identifying a device to a network.

FIG. 8 is an action diagram of an embodiment of a method to identify a device to the network. At 802 the device activates. At 804 the device provides a device id, such as an IMEI, to the SIM. At 806 the SIM provides an SMS message including the device id and a subscriber id to the device. At 808 the device provides an SMS message including the device and subscriber ids to the network. At 810 the network applies the device id to locate device status information. Device status information includes information about the status of mobile equipment that accesses the network. For example, the lost or stolen status of the device may be indicated by the device status.

At 812 the network applies the subscriber id to locate subscriber services. At 814 the network sets permissions for the subscriber according to the device status. Permissions indicate the services that should be made available to the subscriber associated with the SIM.

Figure 9:
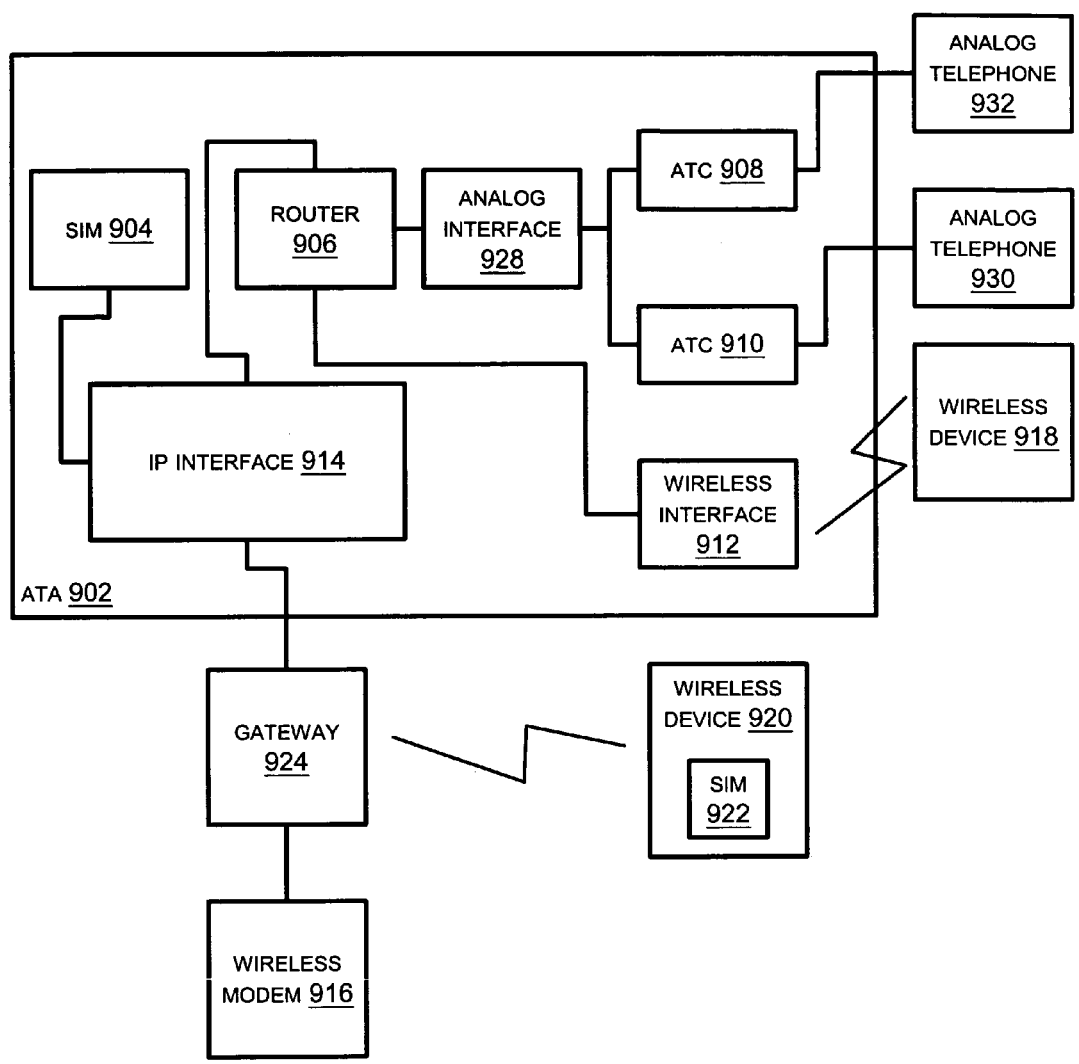
FIG. 9 is a block diagram of an embodiment of a communications arrangement.

FIG. 9 is a block diagram of an embodiment of a communication arrangement. An analog telephone adapter (ATA) 902 comprises a SIM 904, a router 906, analog telephone components (ATC) 908 and 910, a wireless interface 912, an IP interface 914, and an analog interface 928.

The SIM 904 is coupled to the IP interface 914. The router 906 is coupled to the analog interface 928 and the wireless interface 912. The analog interface 928 is coupled to the ATC 908 and the ATC 910. The ATC 908 is coupled to an analog telephone 932, and the ATC 910 is coupled to an analog telephone 930.

The IP interface 914 is coupled to a gateway 924, such as a digital router, hub, or firewall. The gateway 924 is coupled to a broadband modem, such as a wireless modem 916.

The ATC 908 provides an interface by which an analog telephone 932 may communicate with the analog interface 928.

Likewise, the ATC 910 provides an interface by which an analog telephone 930 may communicate with the analog interface 928. The analog interface 928 translates analog communications from the ATCs 908, 910 into digital communications suitable for processing by the router 906. This may be accomplished, for example, using a digital signal processor. The analog interface 928 also translates communications from the router 906 to an analog form suitable for use by the analog telephones 932, 930. The analog interface 928 also directs communications from the router 906 to the appropriate analog telephone 932,930.

The wireless interface 912 provides an interface between a short-range (e.g. Bluetooth) wireless device 918 and the router 908.

The router 906 directs communications from the analog interface 928 and wireless interface 912 to the IP interface 914. Either the router 906 or the IP interface 914 may apply subscriber information of the SIM 904 to communications from the router. Thus, communications from the analog telephones 932,930 and the short-range wireless device 918 may be associated with subscriber information comprised by the SIM 904.

The router 906 also directs communications from the IP interface 914 to the analog interface 928 and the wireless interface 912. Routing may be based upon IP addresses assigned to communications to and from the analog telephones 932,930 and the wireless device 918.

A second wireless device 920 comprises a SIM 922. The second wireless device 920 may communicate with the gateway 924 without involvement of the ATA 902. Communications from the wireless device 920 may be associated with subscriber information of the SIM 922.

Figure 10:
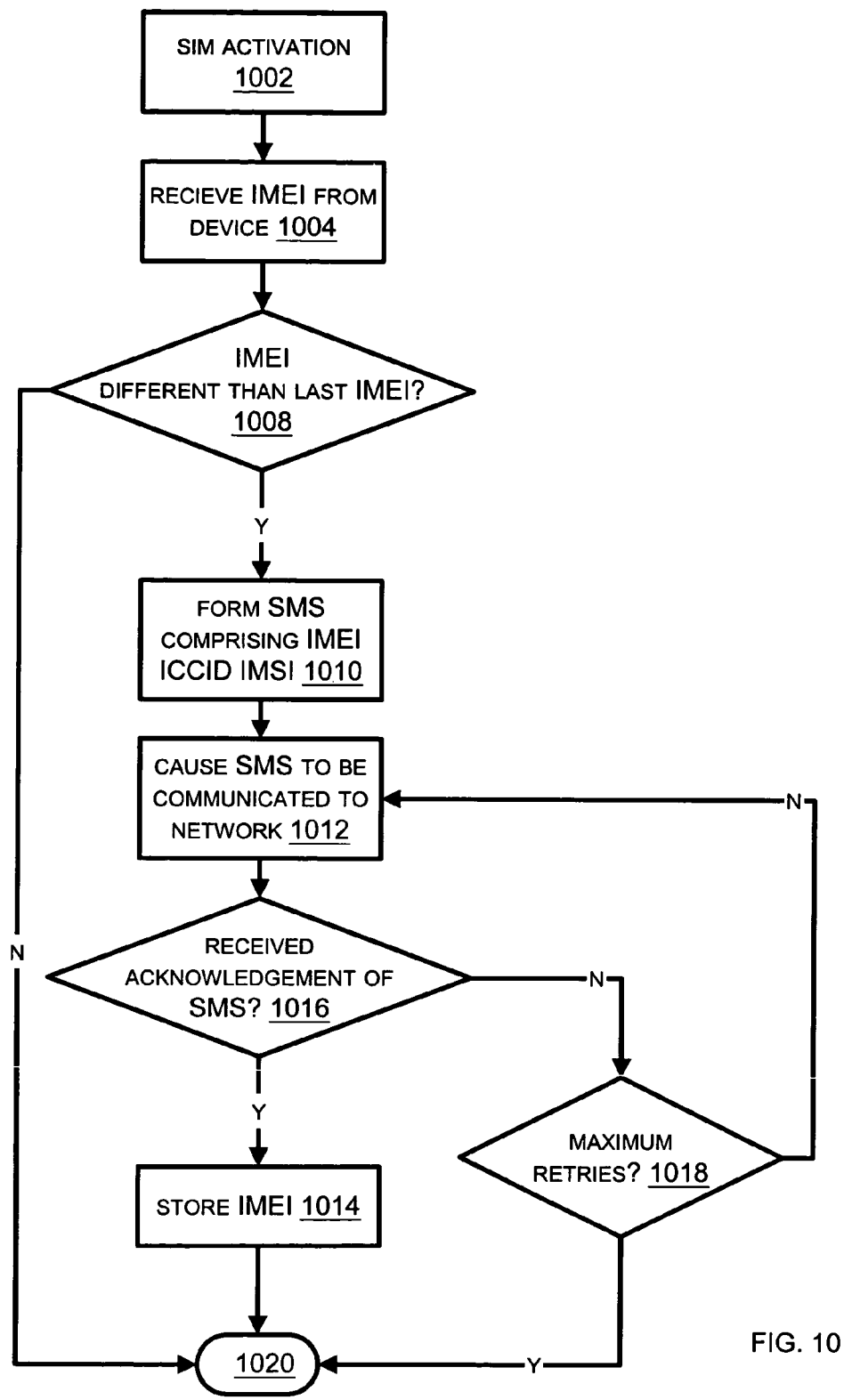
FIG. 10 is a flow chart of an embodiment of a method of identifying a device to a network.

FIG. 10 is a flow chart of an embodiment of a method of identifying a device to a network. At 1002 a SIM is activated, for example by coupling the SIM with a device. Alternatively, a device to which the SIM is coupled may be activated (e.g. powered on or otherwise prepared for use). At 1004 the SIM receives an IMEI or other device identification. The IMEI (or other identification) may be provided in response to a communication from the SIM to the device, or may be provided without prompting by the SIM. At 1008 it is determined whether the received IMEI is different than the last IMEI received by the SIM. If the IMEI is not different, the method concludes at 1020. If the IMEI is different, an SMS (or EMS, or MMS) message is formed comprising the IMEI at 1010. The message may also comprise subscriber identification (e.g. International Mobile Subscriber Identity (IMSI) and/or Integrated Circuit Card ID (ICCID)).

At 1012 the SIM causes the SMS message to be communicated to the network. For example, the SIM may provide the message to the device to which it is coupled, and the device may communicate the message wirelessly to the network. At 1016 it is determined whether an acknowledgement of the message has been received. If an acknowledgement has been received, the IMEI is stored by the SIM at 1014 and the method concludes at 1020. Otherwise, it is determined at 1018 whether or not the maximum number of retries to communicate the message has been reached. If not, the SIM again attempts to cause the message to be communicated to the network at 1012. If the maximum number of retries has been reached, the method concludes at 1020.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

What is claimed is:

1. A method of identifying a communication device without a subscriber identity module (SIM) with a SIM located in a separate terminal device, comprising:
   the communication device communicating with the SIM through an analog interface in the terminal device;
   the terminal device providing a device identifier to the subscriber identity module;
   the subscriber identity module forming a message comprising the device identifier; and
   the device communicating the message to a network;
   wherein the SIM-generated message is generated in response to activation of the SIM in the terminal device, the SIM requesting device information from the terminal device and the device providing the device information to the SIM.

2. The method of claim 1, further comprising:
   the subscriber identity module forming one of an Short Message Service, Enhanced Message Service, Multimedia Message Service, and SyncML message.

3. The method of claim 1, further comprising:
   the message comprising a subscriber identifier.

4. The method of claim 1, further comprising:
   the message comprising subscriber information.

5. The method of claim 1, further comprising:
   the device identifier comprising an International Mobile Equipment Identity.

6. The method of claim 3, further comprising:
   the subscriber identifier comprising at least one of an International Mobile Subscriber Identity and an Integrated Circuit Card ID.

7. The method of claim 1, further comprising:
   the message communicated to the network only when the device identifier is different than a device identifier stored by the subscriber identity module.

8. The method of claim 1, further comprising:
   the subscriber identity module storing the device identifier as a result of receiving an acknowledgement from the network that the message was received.

9. The method of claim 1, further comprising:
   the terminal device providing the device identifier to the subscriber identity module in response to the device being powered on.

10. The method of claim 1, further comprising:
    the subscriber identity module requesting the device identifier from the terminal device in response to subscriber identity module activation.

11. An analog telephone adaptor having a subscriber identity module (SIM), the adaptor comprising:
    a SIM including:
       at least one processors;
       logic that, when applied to one or more of the at least one processors, results in a terminal device providing a device identifier to the subscriber identity module;
    the subscriber identity module forming a message comprising the device identifier; and
    the subscriber identity module causing the device to communicate the message to a network, wherein the SIM-generated message is generated in response to activation of the SIM in the terminal device, the SIM requesting device information from the terminal device and the device providing the device information to the SIM;
    an analog and/or wireless interface in communication with the SIM for passing communication from analog and/or wireless devices.

12. The subscriber identity module of claim 11, further comprising:
    logic that, when applied to one or more of the at least one processors, results in forming a message that is one of Short Message Service, Enhanced Message Service, Multimedia Message Service, and SyncML.

13. The subscriber identity module of claim 11, further comprising:
    logic that, when applied to one or more of the at least one processors, results in forming a message comprising a subscriber identifier.

14. The subscriber identity module of claim 11, further comprising:
    logic that, when applied to one or more of the at least one processors, results in forming a message comprising subscriber information.

15. The subscriber identity module of claim 11, further comprising:
    logic that, when applied to one or more of the at least one processors, results in forming a message comprising a device identifier comprising an International Mobile Equipment Identity.

16. The subscriber identity module of claim 13, further comprising:
    logic that, when applied to one or more of the at least one processors, results in forming a message comprising a subscriber identifier comprising at least one of an International Mobile Subscriber Identity and an Integrated Circuit Card ID.

17. The subscriber identity module of claim 11, further comprising:
    logic that, when applied to one or more of the at least one processors, results in communicating the message to the network only when the device identifier is different than a device identifier stored by the subscriber identity module.

18. The subscriber identity module of claim 11, further comprising:
  logic that, when applied to one or more of the at least one processors, results in storing the device identifier as a result of receiving an acknowledgement from the network that the message was received.

19. The subscriber identity module of claim 11, further comprising:
  logic that, when applied to one or more of the at least one processors, results in the subscriber identity module receiving the device identifier in response to the terminal device being powered on.

20. The subscriber identity module of claim 11, further comprising:
  logic that, when applied to one or more of the at least one processors, results in the subscriber identity module requesting the device identifier from the terminal device in response to subscriber identity module activation.

21. An analog adaptor for a mobile device comprising:
  a subscriber identity module (SIM);
  at least one processors;
  logic that, when applied to one or more of the at least one processors, results in the mobile device providing a device identifier to a subscriber identity module;
  the subscriber identity module forming a message comprising the device identifier; and
  the mobile device communicating the message to a network, wherein the SIM-generated message is generated in response to activation of the SIM in the mobile device, the SIM requesting device information from the mobile device and the device providing the device information to the SIM;
  an analog and/or wireless interface in communication with the SIM for passing communication from analog and/or wireless devices.

22. The mobile device of claim 21, further comprising:
  at least some of the at least one processors and at least some of the logic comprised by the subscriber identity module.

23. The mobile device of claim 21, further comprising:
  logic that, when applied to one or more of the at least one processors, results in forming the message as one of Short Message Service, Enhanced Message Service, Multimedia Message Service, and SyncML.

24. The mobile device of claim 21, further comprising:
  logic that, when applied to one or more of the at least one processors, results in forming the message to comprise a subscriber identifier.

25. The mobile device of claim 21, further comprising:
  logic that, when applied to one or more of the at least one processors, results in forming the message to comprise subscriber information.

26. The mobile device of claim 21, further comprising:
  logic that, when applied to one or more of the at least one processors, results in forming the message to comprise an International Mobile Equipment Identity for the device identifier.

27. The mobile device of claim 24, further comprising:
  logic that, when applied to one or more of the at least one processors, results in forming a message to comprise at least one of an International Mobile Subscriber Identity and Integrated Circuit Card ID for the subscriber identifier.

28. The mobile device of claim 21, further comprising:
  logic that, when applied to one or more of the at least one processors, results in communicating the message to the network only when the device identifier is different than a device identifier stored by the subscriber identity module.

29. The mobile device of claim 21, further comprising:
  logic that, when applied to one or more of the at least one processors, results in the subscriber identity module storing the device identifier as a result of receiving an acknowledgement from the network that the message was received.

30. The mobile device of claim 21, further comprising:
  logic that, when applied to one or more of the at least one processors, results in the mobile device providing the device identifier to the subscriber identity module in response to the mobile device being powered on.

31. The mobile device of claim 21, further comprising:
  logic that, when applied to one or more of the at least one processors, results in the subscriber identity module requesting the device identifier from the mobile device in response to subscriber identity module activation.

32. A method of identifying a communication device without a subscriber identity module (SIM) with a SIM located in a separate terminal device, comprising:
  a terminal device providing a device identifier to an analog telephone adapter;
  the analog telephone adapter forming a message that is one of Short Message Service, Enhanced Message Service, Multimedia Message Service, and SyncML; and
  the analog telephone adapter communicating the message to a network using Internet Protocol;
  wherein a SIM-generated message is generated in response to activation of the SIM in the terminal device, the SIM requesting device information from the terminal device and the device providing the device information to the SIM.

33. The method of claim 32, further comprising:
  the analog telephone adapter providing the device identifier to the subscriber identity module; and
  the subscriber identity module forming the message.

34. The method of claim 33, further comprising:
  the subscriber identity module forming the message to comprise a subscriber identifier.

35. The method of claim 33, further comprising:
  the subscriber identity module forming the message to comprise subscriber information.

36. The method of claim 32, further comprising:
  the device identifier comprising an International Mobile Equipment Identity.

37. The method of claim 34, further comprising:
  the subscriber identifier comprising at least one of an International Mobile Subscriber Identity and an Integrated Circuit Card ID.

38. The method of claim 32, further comprising:
  the message communicated to the network only when the device identifier is different than a device identifier stored by the subscriber identity module.

39. The method of claim 34, further comprising:
  the subscriber identity module storing the device identifier as a result of receipt of an acknowledgement from the network that the message was received.

* * * * *